INVENTOR.
RALPH M. HEINTZ.
DAVID J. CONANT.
BY
ATTORNEY.

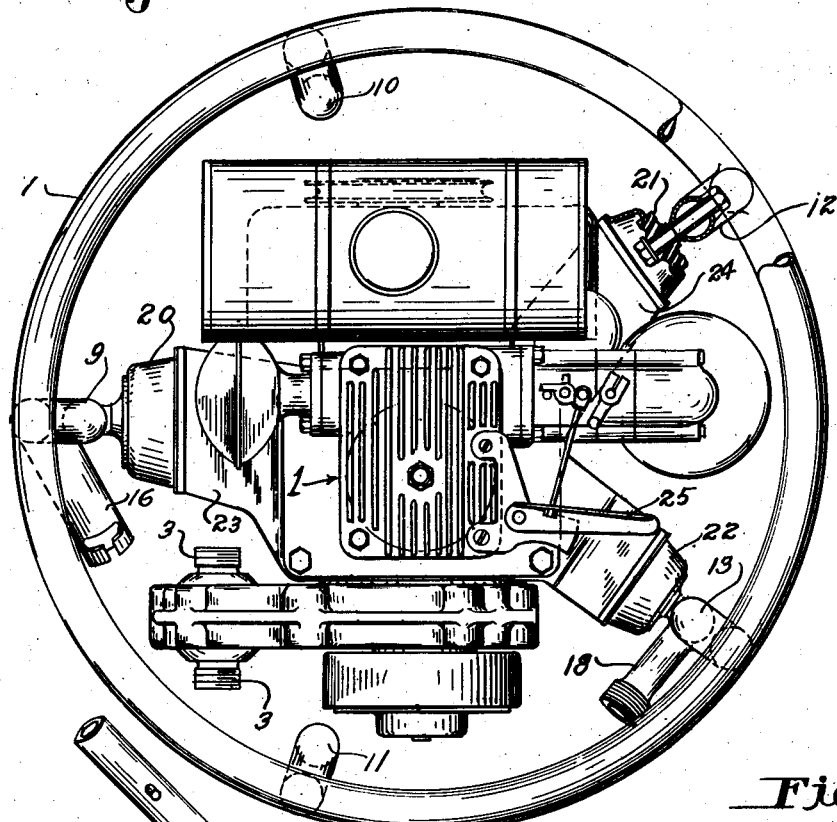
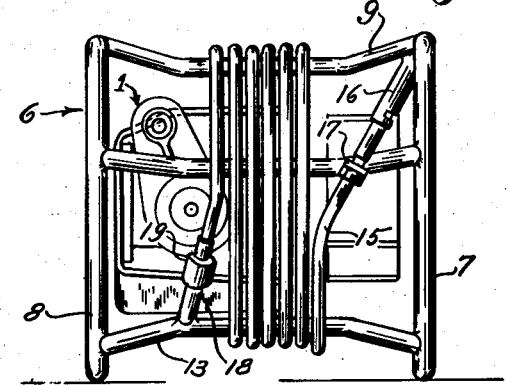

Oct. 31, 1944.  R. M. HEINTZ ET AL  2,361,768
SELF-CONTAINED ENERGIZER
Filed May 8, 1943  3 Sheets-Sheet 3

INVENTOR.
RALPH M. HEINTZ.
DAVID J. CONANT.
BY
Frank H. Harmon
ATTORNEY.

Patented Oct. 31, 1944

2,361,768

UNITED STATES PATENT OFFICE 2,361,768

SELF-CONTAINED ENERGIZER

Ralph M. Heintz, Cleveland, and David J. Conant, Cleveland Heights, Ohio, assignors, by mesne assignments, to Jack & Heintz, Inc., Cleveland, Ohio, a corporation of Ohio Application May 8, 1943, Serial No. 486,266

6 Claims. (Cl. 74—16)

This invention relates to a portable self-contained energizer for starting aircraft engines, and novel mounting means therefor.

The general object of the invention is to provide an energizer which is independent of external power sources, light in weight, and of rugged construction so that it may be carried in the aircraft and made immediately available for starting aircraft engines on the ground wherever the aircraft may be.

A further object is to provide a supporting frame for an energizer of the type described which renders the energizer easy to carry or roll over a relatively flat surface, which will protect the energizer power unit, and which contains convenient means for carrying a sufficient length of flexible energizer cable.

A particular object is to provide an energizer supporting frame in the form of a reel which may be rolled over the ground and on which the energizer cable may be wound for convenient access.

Figure 1:
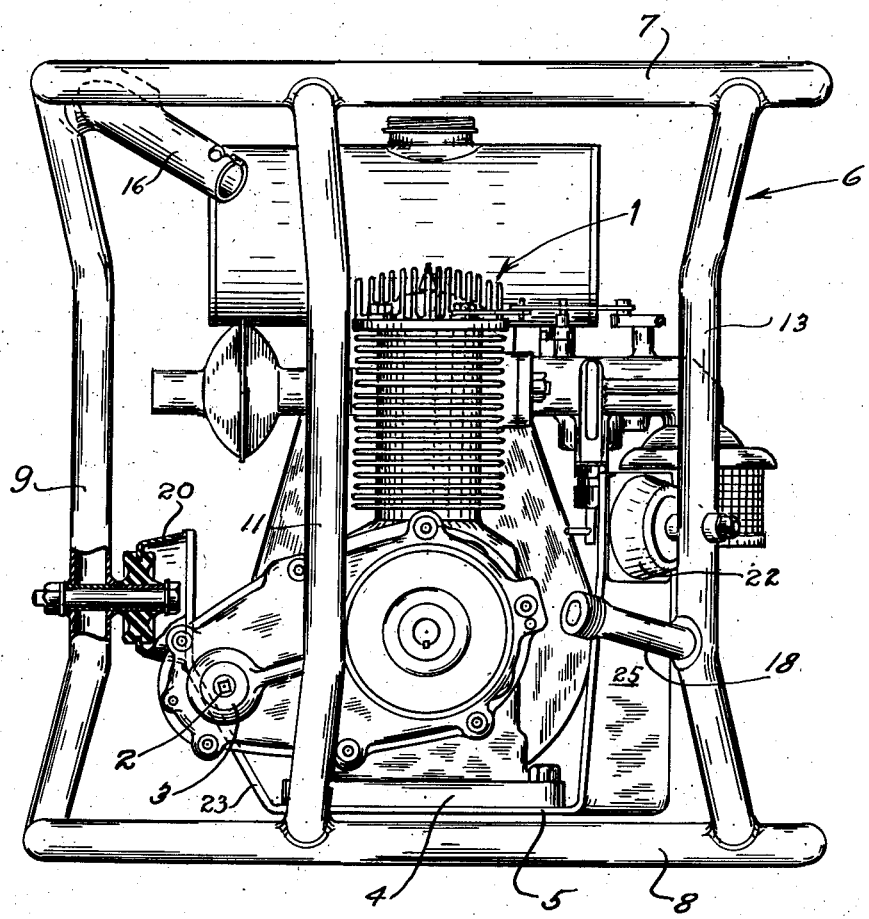
Figure 3:
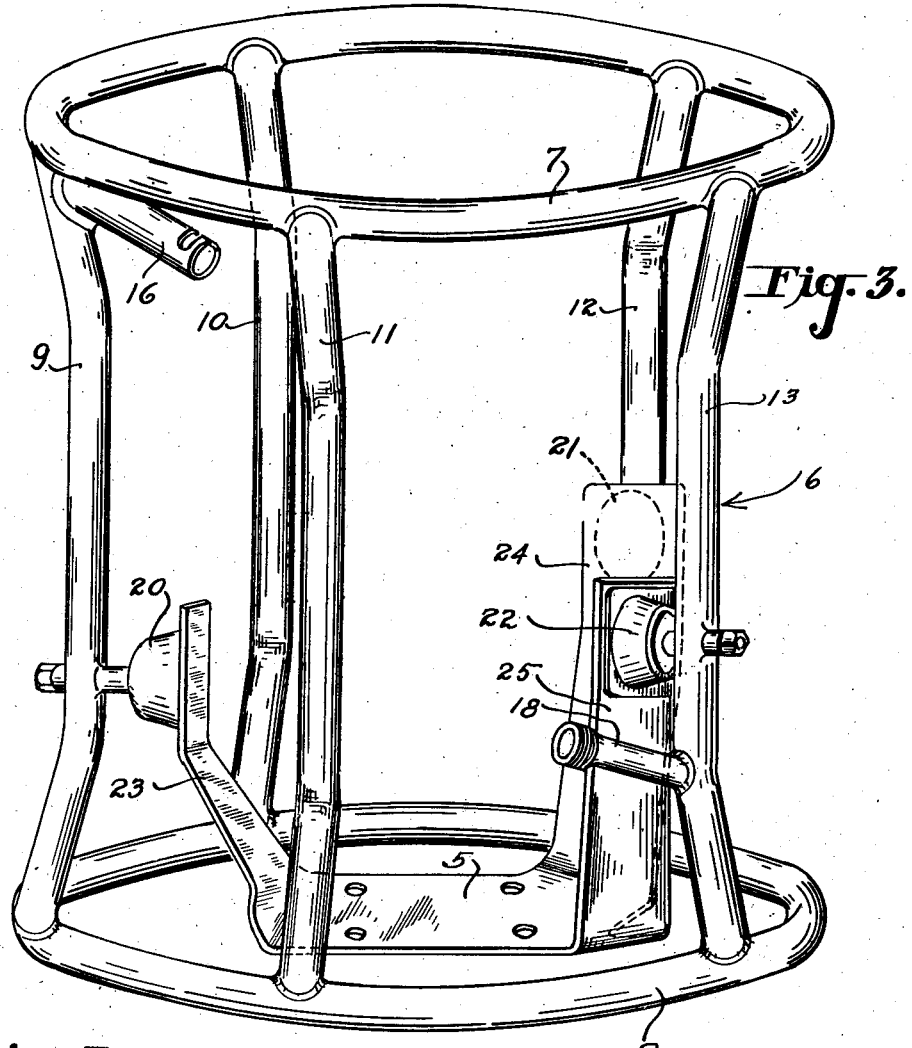
Figure 5:
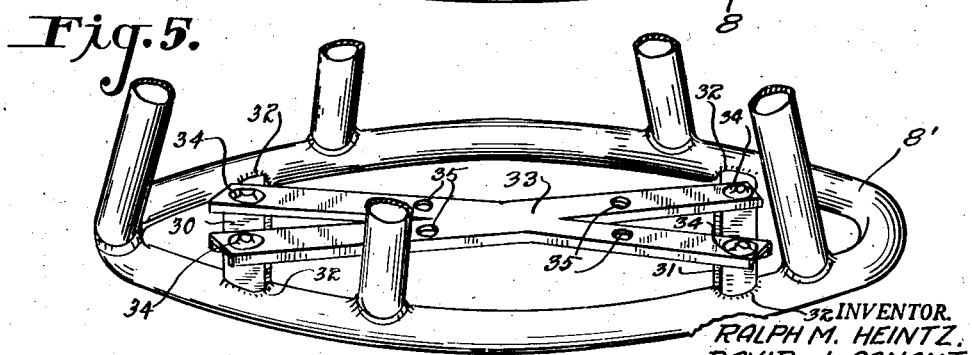

The principles of the invention are illustrated in the accompanying drawings in which:

Figure 1 is a side elevation view of the present energizer standing on its base in operating position, Figure 2 is a top plan view, Figure 3 is a perspective view of the supporting frame, Figure 4 is a side view showing the cable coiled on the reel and the energizer lying on its side in a position to be rolled over the ground, and Figure 5 is a fragmentary view of a modified base construction.

When it is necessary or desirable to start large aircraft engines by external means it is customary to apply a hand crank or electric energizer to the external hand crank connection to accelerate the flywheel of the inertia starter on each engine. The present invention provides a convenient portable energizer which may be carried in the airplane, and which obviates the necessity for muscular cranking effort and electric power sources. It also obviates the necessity for electric motors in the inertia starters on a multi-engine aircraft, thereby effecting an overall saving in weight of accessory equipment and relieving the aircraft battery of starting loads.

The energizer of the present invention is powered by a light gas engine and may be easily carried by one man with the engine running. A rugged tubular supporting frame surrounds the engine for protection against rough handling, provides convenient handle grips for carrying by one or two men, and is designed with end rings for rolling over the ground. An hourglass contour of the frame between the end rings is used as a reel for winding up the energizer cable after a starting operation, keeping the cable in an orderly manner and immediately available for use.

Referring now to the drawings, numeral 1 indicates a self-contained power unit consisting of an internal combustion engine having a power takeoff 2 and associated couplings 3 for connecting a flexible energizer cable. The engine has a base 4 bolted to a hanger 5 having three point suspension in a supporting frame designated generally by the numeral 6.

The frame 6 is constructed of tubular members and comprises a pair of circular end or base rings 7 and 8 connected by longitudinal members 9, 10, 11, 12 and 13, these members being bent inwardly as shown to give an approximate hourglass contour to the frame as a whole thereby providing reel space for winding on an energizer cable 15 in the manner shown in Figure 4. The frame 6 carries a fitting 16 corresponding to an energizer socket on an aircraft for receiving and securing a coupling 17 on one end of the energizer cable, and the longitudinal member 13 is provided with a fitting 18 corresponding to the coupling 3 for receiving and securing a coupling 19 on the other end of the energizer cable, these fittings serving to protect the ends of the cable and to prevent the cable from unwinding from around the frame.

Longitudinal member 9 carries a resilient mounting member 20 attached to an upstanding leg 23 of the hanger 5, and longitudinal members 12 and 13 carry resilient mounting members 21 and 22 attached to upstanding legs 24 and 25 on the hanger, the arrangement preferably being such that a plane through the mounting members 20, 21 and 22 passes through the center of gravity of the engine in order to reduce vibration in the frame 6.

It will thus be seen that the frame 6 completely surrounds the engine for protection and provides a base to support the engine in an upright position in operation as shown in Figure 1. As seen in Figure 2, the two couplings 3—3 associated with the power takeoff provide for connecting the energizer cable for either right or left hand rotation. In starting a plurality of airplane engines or the like, the energizer may be easily carried by the ring 7 from one engine to the next while the engine 1 is running, the energizer cable being connectible on the proper coupling 3 to give the desired direction of rotation. The circular end rings 7 and 8, besides providing bases for standing and stacking a plurality of such energizers, form convenient hand grips and also provide hoops for rolling the energizer over the ground or runway.

After use, the coupling 19 may be readily removed from the coupling 3 and secured on the fitting 18, the length of the cable being wound around the reel with the coupling 17 secured in the fitting 16 to hold the cable in place. The couplings 3 and 19 and the fitting 18 are shown as screw threaded, while the fitting 16 takes the form of a socket with a bayonet slot to receive the coupling 17 which is provided with a locking pin as shown in Figure 2. The energizer cable 15 is of conventional construction, having a flexible shaft in a flexible casing and coupling members on the casing adapted to removably hold the opposite ends of the flexible shaft in rotational engagement with an energizer and an aircraft energizer receptacle or fitting.

The energizer may be conveniently rolled over the ground, the cable being unreeled in approaching the location where it is to be used, and reeled up again in leaving the last starting operation. When several engines are to be started, the energizer may be carried by the ring 7 from one engine to the next without shutting off the gas engine 1.

The hanging of the engine in the frame 6 through its center of gravity is such that the least amount of vibration is transmitted to the frame in order that the latter will rest solidly on its base ring 8 in operation, the base being of sufficient diameter to afford adequate stability. If desired, the ends or sides of the frame 6 may be closed to keep out dirt, and the frame members may take other shapes than shown.

Figure 5 shows a simplified engine mounting on a base ring 8' corresponding to base ring 8. A pair of channel cross-members 30 and 31 are welded to the ring 8' at points 32 and carry an X or K channel platform 33 on four resilient supports 34 similar to the resilient mounting members 20, 21 and 22. Bolt holes 35 are positioned to receive the engine base 4 with substantially equal loading on each support 34. The base construction shown in Figure 5 has the advantage of allowing greater freedom of access to the inner coupling 3 and the starting cord or crank for the engine 1.

All such changes and modifications are deemed to lie within the scope of the invention, the same being limited only by the appended claims.

We claim:

1. An energizer comprising a self-contained power unit having a power takeoff, a coupling on said power takeoff for connecting a flexible power transmitting cable, a hollow frame protectively supporting said power unit therewithin, the exterior of said frame forming a reel for said cable, and a fitting on said frame similar to said coupling for securing an end of said cable on said reel.

2. An energizer comprising a self-contained power unit, a power takeoff on said power unit, a coupling on said power takeoff for connecting a flexible power transmitting cable, a hollow frame protectively supporting said power unit therewithin, the exterior of said frame having circular top and bottom bases and forming a reel for said cable, a fitting on said frame similar to said coupling for securing an end of said cable and another fitting in said frame for securing the other end of said cable.

3. An energizer comprising a self-contained power unit, a power takeoff on said power unit, a hollow frame protectively supporting said power unit therewithin, said frame having similar top and bottom bases for supporting said power unit in a stable upright position for operation, said bases being circular for rolling said energizer over a supporting surface.

4. A portable energizer comprising a frame, top and bottom base rings on said frame, inwardly curved longitudinal members interconnecting said base rings, a plurality of resilient mounting members on said longitudinal members, a gas engine carried by said resilient mounting members, a power takeoff on said engine, a coupling on said power takeoff for connecting one end of the flexible energizer cable, a fitting on said frame similar to said coupling for securing said end of said cable, said curved longitudinal members forming a reel for said cable, and a fitting on said frame for securing the other end of said cable to prevent unwinding from said reel.

5. A portable energizer comprising top and bottom base rings, a plurality of inwardly curved longitudinal members connecting said base rings, a plurality of resilient mounting members on said longitudinal members, and a hanger having an engine supporting portion adjacent one of said base rings and a plurality of upwardly extending arms connected with said resilient mounting members, a gas engine secured on said hanger so as to be in upright position when said device is supported on said one base ring, a power takeoff on said engine, a coupling on said power takeoff for connecting a flexible energizer cable, the curvature of said longitudinal members constituting a reel between said base rings for carrying said energizer cable, and said base rings constituting rolling supports for said energizer, and means to secure the ends of said cable against unwinding from said reel.

6. A portable energizer comprising circular top and bottom base rings, a plurality of inwardly curved longitudinal members connecting said base rings, said base rings and longitudinal members constituting a protective supporting frame adapted for rolling on a supporting surface, a platform resiliently supported on said bottom base ring and a gas engine secured to said platform within said frame.

RALPH M. HEINTZ.
DAVID J. CONANT.